United States Patent [19]

Fisk et al.

[11] Patent Number: 5,586,580

[45] Date of Patent: Dec. 24, 1996

[54] APPARATUS AND METHOD FOR INTERNALLY SEALING PIPES

[75] Inventors: Allan T. Fisk, Needham; David I. Freed, Waltham, both of Mass.

[73] Assignee: Gas Research Institute, Chicago, Ill.

[21] Appl. No.: 415,267

[22] Filed: Apr. 3, 1995

[51] Int. Cl.[6] .................................................. F16L 55/162
[52] U.S. Cl. ............................ 138/98; 138/108; 156/94; 264/269
[58] Field of Search .............................. 138/97, 98, 108; 264/269, 34, 35; 156/94, 98

[56] References Cited

U.S. PATENT DOCUMENTS

| | | | |
|---|---|---|---|
| 2,894,539 | 7/1959 | Cook et al. | 138/97 |
| 2,942,998 | 5/1960 | Newcomb . | |
| 2,998,800 | 9/1961 | Vernooy . | |
| 3,022,765 | 2/1962 | Xenis . | |
| 3,334,389 | 8/1967 | Matheny . | |
| 3,488,213 | 1/1970 | Bellato . | |
| 3,810,441 | 5/1974 | Padgett et al. . | |
| 3,956,810 | 5/1976 | Chapman | 138/108 |
| 4,178,875 | 12/1979 | Moschetti | 138/97 |
| 4,216,738 | 8/1980 | Muta . | |
| 4,308,824 | 1/1982 | Muta et al. | 138/97 |
| 4,371,569 | 2/1983 | Muta et al. . | |
| 4,439,469 | 3/1984 | Wood . | |
| 4,643,855 | 2/1987 | Parkes et al. | 138/97 |
| 4,723,873 | 2/1988 | Masznyik | 138/97 |
| 4,741,795 | 5/1988 | Grace et al. | 138/98 |
| 5,195,392 | 3/1993 | Moore et al. | 138/97 |
| 5,246,641 | 9/1993 | Perkins et al. | 138/97 |
| 5,279,168 | 1/1994 | Timm | 73/866.5 |
| 5,309,947 | 5/1994 | Hinger | 138/98 |
| 5,329,824 | 7/1994 | Carapezza et al. . | |

*Primary Examiner*—David Scherbel
*Assistant Examiner*—James F. Hook
*Attorney, Agent, or Firm*—Hill, Steadman & Simpson

[57] ABSTRACT

An apparatus and method for sealing joints and leaks in pipes is provided. The apparatus is particularly useful for sealing leaking at joints in underground gas mains. A sealant applicator in the form of a push snake is provided which may be inserted into the pipe through a standard tap fitting. Thick or viscous sealant is pumped down through the snake and is thereafter applied radially outward to the inside surfaces of the pipe by a spinning applicator tip. Flaps may be attached to the spinning applicator tip so that the thick sealant is trowelled into place. The applicator tip may be rotated with compressed gas which may be compressed methane gas drawn from the gas main. A centralizer is preferably employed to centralize the applicator head in place during application of the sealant. The flaps may also be used to clean the pipe prior to the application of the sealant.

21 Claims, 4 Drawing Sheets

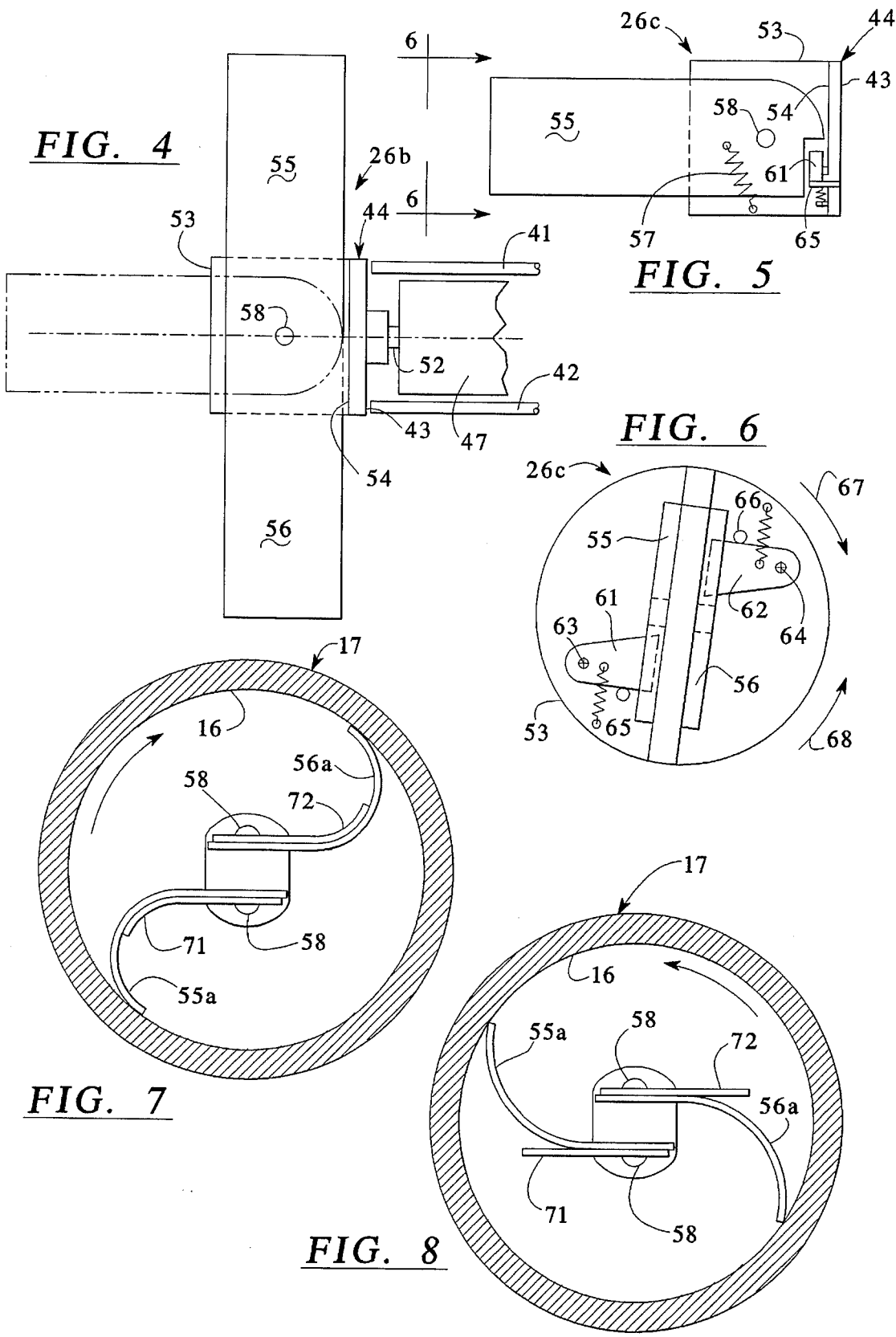

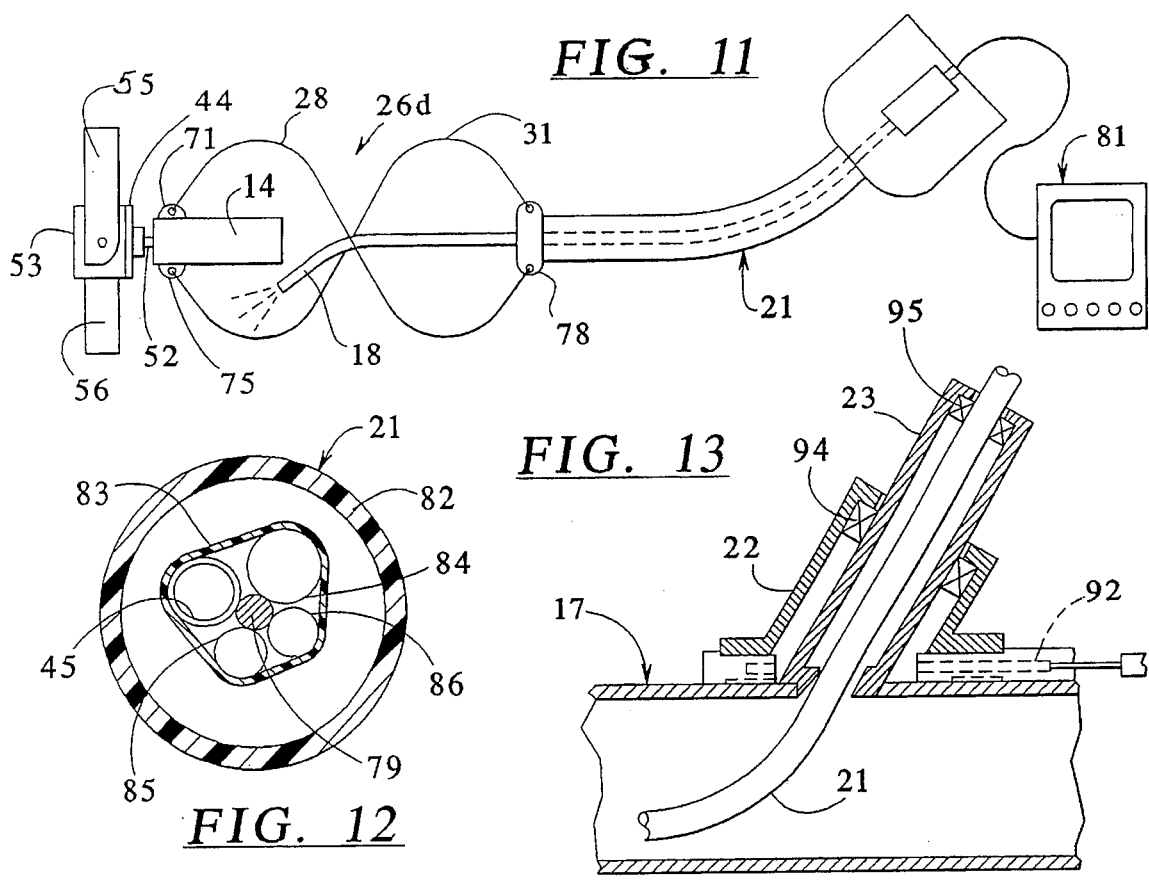

APPARATUS AND METHOD FOR INTERNALLY SEALING PIPES

FIELD OF THE INVENTION

This invention relates generally to the repair and maintenance of pipes, such as underground cast iron gas mains. More particularly, the present invention relates to an apparatus and method for applying liquid sealant to the inside surfaces of pipes to seal leaks, cracks and joints thereof.

BACKGROUND

The repair and maintenance of underground gas mains has long been a problem for municipalities. In particular, to repair a leaking gas main, the precise area of the leak must be located, and then the earth surrounding the leaking pipe must be excavated. The excavation process is time consuming, costly and a nuisance to the public if use of a busy street is interrupted.

The most common location for a leak in a gas main is at a joint between two adjoining pipes. Typically, a joint of a gas main includes a bell-shaped female end in which a straight male end is inserted. Jute, or fibrous material, is inserted inside the heel of the bell. The distal end of the male pipe engages the jute which serves as a seal between the bell-shaped female member and the end of the male member. A relatively permanent seal is provided by the insertion of lead, concrete or other material inside the bell between the inside surface of the bell and the outside surface of the male pipe.

The problem with the above-referenced gas main design is that it will eventually leak. The condition of the jute material will degrade over time thereby enabling gas to escape through the jute before coming in contact with the lead or cement. The lead or cement will also degrade with time and a perfect seal may not have been obtained during the initial installation. The result is a leaking gas main joint which, until now, would have to be excavated to be successfully repaired.

The prior art teaches three primary methods for fixing a leaky joint in a gas main, all of which are problematic. One method would be to excavate the leaky joint and clamp an external seal to the joint or apply a heavy coat of sealant to encapsulate the outside surface of the leaky joint. Of course, this method is inherently expensive due to the excavation costs, which often involve the excavation in the middle of a busy street.

In addition to clamping an external seal or applying a heavy coat of sealant to the outside of the joint area, another method involves drilling a hole into the joint and injecting sealant into the joint space. Of course, this method also involves a costly excavation which, if possible, is to be avoided.

As opposed to the above methods, one internal method has been developed which involves the use of a snake with a spray nozzle disposed at a distal end thereof. The snake is fed into the gas main and the nozzle sprays a thin coat of anaerobic sealant onto the joint. However, because the sealant must be sprayed, the sealant must also have a thin consistency or low viscosity. Low viscosity sealants are simply ineffective at repairing deteriorated jutes and large cracks because a thicker, more viscous sealant is required for these types of repairs. Accordingly, if the jute is relatively damaged or if large cracks or deteriorated pipe is present, the spray system taught by the prior art is simply insufficient.

Accordingly, there is a long-felt need for an apparatus and method for delivering thick sealant to the inside surfaces of gas mains and other pipes for the repair of leaky joints, cracks and corroded portions of the gas mains or pipes. The method and apparatus should also preferably eliminate or at least minimize the need for excavation.

SUMMARY OF THE INVENTION

The present invention satisfies the aforenoted need by providing an apparatus for repairing leaking joints, cracks and deteriorated sections of gas mains and other pipes from the inside of the gas mains or pipes.

The apparatus of the present invention includes a push snake which is inserted to the pipe at a tap fitting or launch point. The push snake provides a means for transporting the applicator head to the leaking area and also provides communication between the surface equipment and the applicator head. More specifically, the push snake houses the communication conduit between the reservoir of pressurized sealant disposed on the surface and the applicator tip as well as communication conduit between a power source disposed on the surface and a motor or means for rotating the applicator tip.

The applicator tip is a part of the applicator head disposed on the distal end of the push snake. The head also includes a means for rotating the applicator tip and a means for delivering liquid sealant to the applicator tip. In the preferred embodiment, the applicator tip is a rotating disk that rotates about an axis parallel with the snake and parallel to the axis of the pipe under repair. Thick, liquid sealant under pressure is delivered to an inside surface of the disk while the disk is rotating. Centrifugal forces exerted onto the liquid sealant by the rotating disk "sling" the sealant radially outward toward the inside surface of the pipe. In the preferred embodiment, the sealant is delivered by one or more delivery tubes as opposed to spray nozzles. By avoiding the use of spray nozzles, a thicker sealant may be used which is infinitely more effective at sealing leaks disposed at the top part of the pipe (i.e. the thick sealant will be more resistant to dripping downward). Further, a thick sealant is far preferable in making substantial repairs such as in the case when the jute is substantially damaged or deteriorated or when large cracks are present.

Because a thick sealant is used in the present invention, it is preferable to include a means for trowelling or pushing the sealant up against the inside wall of the pipe. Trowelling enhances the penetration of the sealant into the area in need of repair. To accomplish the trowelling, in the preferred embodiment, the applicator tip includes one or more flaps that are pivotally attached to an extension disposed forward of the rotating disk of the applicator tip. When the disk and flaps are not rotating, the flaps may be biased into a position that is parallel with the axis of the snake and the axis of the pipe so that the applicator tip may be more easily inserted through the launching point. When the disk and flaps are rotating, centrifugal forces imparted onto the flaps cause them to assume a radially outward position. The length of the flaps are chosen so that the ends will easily engage the inside surface of the wall of the pipe.

The flaps serve two functions. First, as noted above, the rotating flaps act as trowels to push the sealant into joints, cracks, fissures and areas where sealant is needed. Second, prior to the application of any sealant, the flaps can act to clean the inside surface of the pipe under repair. To enhance the cleaning ability of the flaps, a stiffening backing member may be provided with each flap. The stiffening backing member is preferably pivotally attached to the applicator tip with its respective flap. When the flaps rotate in one direction (i.e. counterclockwise or clockwise), the stiffening backing members will act as a stiffening force behind the flaps thereby increasing the contact pressure between the ends of the flaps and the inside surface of the pipe which enhances the ability of the flaps to clean the inside surface of the pipe. When the flaps are rotated in an opposing direction (i.e. clockwise or counterclockwise) the flaps are not engaged by the stiffening backing members and the ends of the flaps engage the inside surfaces of the pipe with less contact pressure. This less-forceful engagement between the ends of the flaps and the inside surface of the pipe is ideal for trowelling or manipulating the sealant along the inside surface of the pipe.

The operator may desire to have the option of applying sealant with the disk only (i.e. the "slinging only" method) as opposed to using the disk in combination with the flaps (i.e. the "slinging and trowelling" method). Therefore, it may be desirable to lock the flaps into the axial position. If such an option is desired, locking tabs may be employed to hold the flaps in the axial position.

In larger pipes, centralization of the applicator tips may be necessary. Because the applicator tip and snake must be inserted through a relatively narrow launching point, the centralizer or means for centralization must be collapsible. In the preferred embodiment, at least two spring-like elements are attached to the snake behind the applicator tip. A structural member is used to push the applicator head forward thereby stretching and collapsing the spring-like elements so they will fit through the launching point with greater ease.

Yet another feature that will be desired by some operators will be a means for locating the pipe joints or collars. One preferred method is to take video pictures down in the pipe for transmission to the surface. Fiber scopes, video probes and down hole cameras may be provided at the applicator tip. The video signal may be sent up to the surface through conduits provided in the snake. A less costly alternative would involve magnetic devices including any current sensors, electromagnetic sensors and devices similar to collar locators used in the oil well service industry.

It is therefore an object of the present invention to provide an approved apparatus for sealing leaks in pipes from the inside of said pipes.

Yet another object of the present invention is to provide an improved method of inspecting and repairing leaking gas mains and other pipes.

Still another object of the present invention is to provide an improved method of fixing leaking underground pipes while minimizing the need for excavation.

And another object of the present invention is to provide an improved method of cleaning the inside surfaces of underground pipes.

Other features and advantages of the present invention will appear from the following description in which a limited number of embodiments have been set forth in detail in conjunction with the accompanying drawings.

BRIEF DESCRIPTION OF THE DRAWINGS

This invention is illustrated more or less diagrammatically in the accompanying drawings, wherein:

FIG. 4 is a side view of one applicator tip made in accordance with the present invention, particularly illustrating the use of two trowelling and cleaning flaps;

FIG. 5 is a side plan view of an alternative applicator tip made in accordance with the present invention, particularly illustrating the use of a lock-out tab for the flaps;

FIG. 6 is a front end view of the applicator tip shown in FIG. 5;

FIG. 7 is a front end view of yet another alternative applicator tip made in accordance with the present invention, particularly illustrating the use of flaps with stiffening backing members, the flaps being used to clean the inside surface of the pipe;

FIG. 8 is another front end view of the applicator tip shown in FIG. 7, the flaps being used for trowelling;

FIG. 11 is still another side plan view of the cleaning and repairing apparatus of the present invention, particularly illustrating the video system;

FIG. 12 is a front sectional view of a push snake made in accordance with the present invention; and FIG. 13 is a side sectional view illustrating the insertion of a push snake made in accordance with the present invention through a tap fitting.

Figures 1, 2, 3:
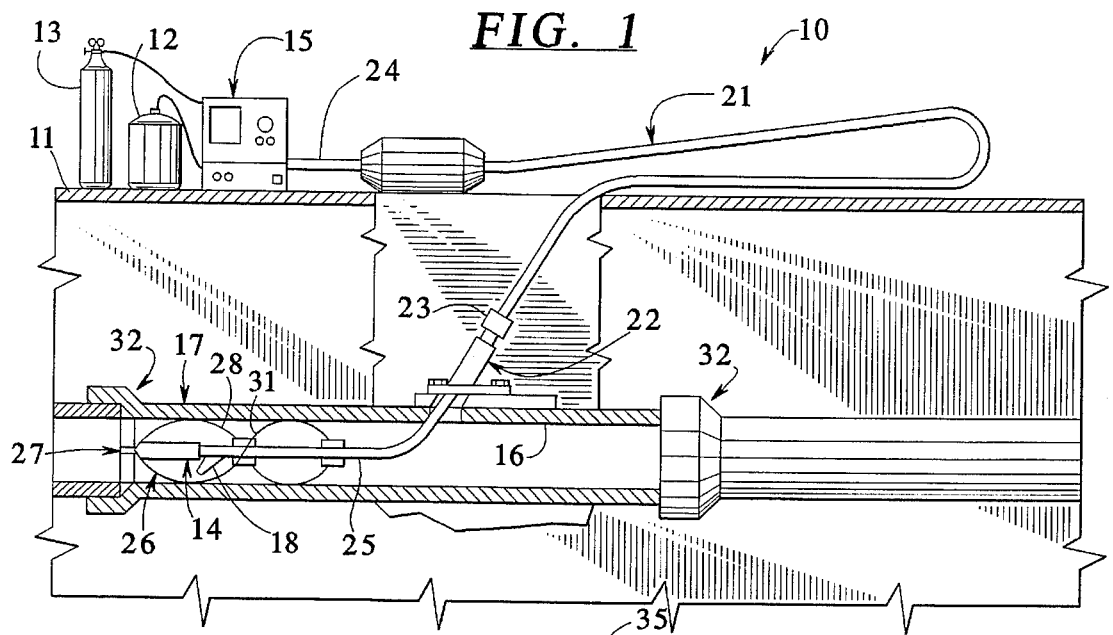
FIG. 1 is a front schematic view of an apparatus for cleaning inside surfaces of pipes and applying a sealant thereto.
FIG. 2 is a sectional view of a typical bell joint used in the construction of gas mains.
FIG. 3 is a side view of one applicator head made in accordance with the present invention.

It should be understood that the drawings are not necessarily to scale and that the embodiments are sometimes illustrated by graphic symbols and diagrammatic representations. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWINGS

Like reference numerals will be used to refer to like or similar parts from Figure to Figure in the following description of the drawings.

The dramatic improvement contributed by the present invention is best understood after consideration of the prior art. First, any method of repairing underground pipes from the outside of said pipes requires excavation at each leak point. As noted above, excavation of underground pipes is inherently expensive and if the pipes were located underneath a busy street can cause a serious nuisance to the public. The only methods for repairing pipes from the inside of said pipes taught by the prior art includes the use of sealant applied through spray nozzles. As noted above, the sealant must have a low viscosity in order to be effectively applied by a spray nozzle. Because the repair of gas mains often involves the repair of the joint or large cracks, low-viscosity sealant is ineffective. Accordingly, the present invention addresses this insufficiency in the prior art by providing an improved method of effectively applying a thick sealant to the inside surfaces of pipes and which requires only one excavation for a number of pipe joints.

Turning to FIG. 1, the schematic view of the apparatus 10 of the present invention is provided. At the surface 11, a reservoir 12 of sealant and a means for providing power 13 to the means 14 for rotating the applicator tip 27 is provided. The control panel 15 enables the operator to activate and deactivate the apparatus 10 and further enables the operator to monitor the inside surface 16 of the pipe 17 through the means 18 for locating the pipe joints 32.

Still referring to FIG. 1, the apparatus also features a push snake 21 which is inserted into the pipe 17 through a tap fitting 22. The mid-section of the push snake 21 accommodates a fitting or launch tube 23 which, as discussed below with respect to FIG. 13, ensures a seal between the standard tap fitting 22 and the mid-section of the snake 21. There is also a seal (not shown) between the tap fitting 22 and the outer surface of the pipe 17. The fitting 22 and tube 23 and their seals allow the snake 21 to be launched into and retrieved from a live, pressurized gas main without releasing gas. The proximate end 24 of the push snake 21 is connected to the control panel 15 which establishes a connection between the push snake 21 and the means for supplying power 13 and the means for supplying pressurized sealant 12 to the applicator tip 27. The distal end 25 of the push snake 21 is connected to the applicator head, shown generally at 26.

The applicator head 26 shown in FIG. 1 features a motor 14 or means 14 for rotating the applicator tip which is shown generally at 27. The head 26 also features four spring members 28, 31 (and two others which are not shown) which act as centralizers.

Turning to FIG. 2, a standard bell joint 32 is illustrated. The bell joint 32 is the typical joint used for the construction of gas mains. In a sectional view shown in FIG. 2, the joint 32 features the bell end 33 which is the female portion of the connection with the male end 34 of the adjoining pipe. Upon initial construction, the male end 34 is inserted inside the bell 33. Jute 35, which is a fibrous material, is packed into the resulting annulus. After the male end 34 and jute 35 are in place, lead, cement, or other material 36 is inserted between the bell 33 and male member 34.

Over the years, the jute 35 may become deteriorated or damaged. Accordingly, gas or other fluid may leak between the jute 35 toward the lead 36. Often, the lead 36 (or cement or other adhesive material which is used) may not provide an effective seal and a leak results. Further, debris such as that shown at 37 may accumulate at the joint 32. The debris 37 may make it difficult to repair the joint internally with sealant, shown at 38. Thus, large quantities of sealant 38 may be required to repair the joint 32 in the event that the jute 35 is substantially damaged or in the event that substantial amount of debris 37 is present. Further, it may be necessary to displace at least the loose portion of the debris 37 prior to repair.

One applicator head 26a for effectively applying thick sealant to the inside surface 16 of pipe 17 is shown in FIG. 3. The applicator head 26a features two delivery tubes 41, 42 that eject sealant onto the rear surface 43 of the rotating disk 44. The delivery tubes 41, 42 are fed by a common conduit 45 and the respective flows are divided at the manifold 46.

The conduit 45 is in communication with the reservoir 12 disposed on the surface (see FIG. 1). The means for rotating the disk is shown at 14. In the embodiment illustrated in FIG. 3, pressurized gas is provided through one of the conduits 48 or 51, the other conduit 48 or 51 serving as an exhaust line. The supply conduit (either 48 or 51) is in communication with the means for providing power 13 shown in FIG. 1. In this case, the means for providing power 13 is a pressurized canister of gas shown at 13. The pressurized gas is used to impart rotation to the shaft 52 which, in turn, imparts rotation to the spinner disk 44. When sealant is ejected through the conduits 41, 42 onto the surface 43 at the spinner disk 44, centrifugal forces imparted to the sealant cause it to be "slung" radially outward toward the inner surface 16 of the pipe 17.

A helpful modification to the applicator head 26a shown in FIG. 3 is illustrated in FIG. 4. Specifically, the modified applicator head 26b features an extension 53 attached to the front side 54 of the spinner disk 44. Two flaps 55, 56 are pivotally attached to the extension 53. When the spinner disk 44 is rotating, the centrifugal forces cause the flaps to extend radially outward as shown in the solid line in FIG. 4 so that the rotating flaps 55, 56 will engage the inside surface 16 of the pipe 17 (not shown in FIG. 4; see FIGS. 7, 8). In the preferred embodiment, the flaps 55, 56 are spring biased forward into the axial position as shown in phantom in FIG. 4 for easier entry through the tap fitting or launch point (see FIGS. 1, 13).

Yet another modification of the flaps 55, 56 is illustrated in FIG. 5. Specifically, a spring 57 biases the flap 55 forward into the axial position shown in FIG. 5. The flap 55 is pivotally attached to the extension or tip 53 at the pin 58. Referring collectively to FIGS. 5 and 6, a lock-out tab 61 is provided to lock the flap 55 in the axial position. Similarly, referring to FIG. 6, a lock-out tab 62 is provided to lock the flap 56 into the axial position.

The lock-out tabs 61, 62 work as follows. Still referring to FIG. 6, both lock-out tabs 61, 62 can rotate about their respective pins 63, 64. In the biased positions shown in FIG. 6, both tabs 61, 62 are resting against their respective tab stops 65, 66. When the applicator tip 53 accelerates in a counter-clockwise direction, or in the direction of the arrow 68, the lock-out tabs 61, 62 will pivot outward about their respective pins 63, 64 due to inertial effects thereby releasing the flaps 55, 56 from their axial positions and allowing the flaps 55, 56 to assume the radial positions shown in FIG. 4 so they will engage the inside surface of the pipe. When the applicator tip 53 accelerates clockwise, or in the direction of the arrow 67, the locking tabs 61, 62 maintain their position thereby holding the flaps 55, 56 in the axial or non-activated position. Of course, other means for activating and deactivating the flaps 55, 56 will be apparent to those skilled in the art.

Turning to FIGS. 7 and 8, modified flaps 55a, 56a are illustrated. Specifically, each flap includes a stiffening backing member 71, 72. During clockwise rotation as shown in FIG. 7, the backing members 71, 72 engage the flaps 55a, 56a thereby stiffening the flaps 55a, 56a. The stiffened flaps 55a, 56a are more effective for cleaning purposes. In contrast, during counterclockwise rotation as shown in FIG. 8, the stiffening members 71, 72 do not engage the flaps 55a, 56a. Thus, the counterclockwise rotation shown in FIG. 8 is effective for trowelling purposes. In essence, a cleaning operation as shown in FIG. 7 requires enhanced frictional engagement between the flaps 55a, 56a and the inside surface 16 of the pipe 17 and therefore the clockwise rotation and engagement of the stiffening members 71, 72 against the flaps 55a, 56a is preferable for cleaning. Trowelling, on the other hand and as shown in FIG. 8, requires less frictional engagement between the flaps 55a, 56a and the inside surface 16 of the pipe 17 and therefore the counterclockwise rotation shown in FIG. 8 is preferable for trowelling.

Figure 9:
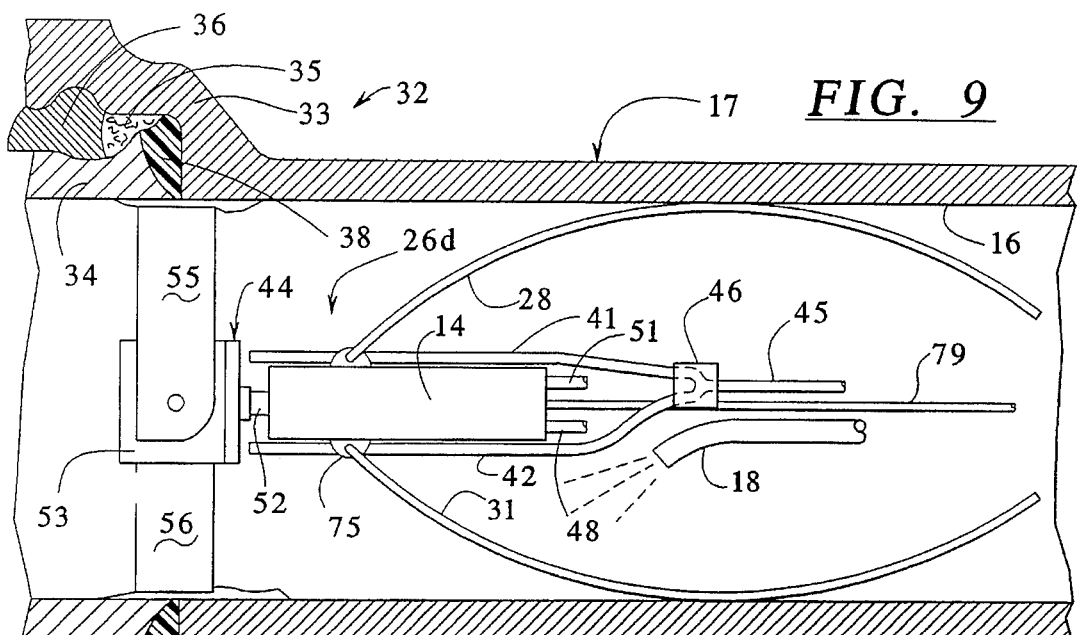
FIG. 9 is a side plan view of a cleaning and repairing apparatus made in accordance with the present invention, particularly illustrating the use of a video system for location of joint collars and inspection of the pipe and further illustrating the use of a centralizer.

Still another view of the applicator head 26d is illustrated in FIG. 9. The applicator head 26d includes a centralizing mechanism featuring four bow springs 28, 31 (and two not shown). The bow springs 28, 31 are attached to the head 26d with a ferrule 75. In addition, a structural member 79 may be provided in the snake along with other companion members (see FIG. 12) which will engage the means 14 for rotating the disk 44. When the structural member 79 and its companion members are pushed forward inside the snake 21, the applicator head 26d is pushed away from the distal end 25 of the snake 21 thereby assisting the bow springs 28, 31 to assume a collapsed position for entry of the snake 21 into the launch tube 23 (see FIGS. 1, 13). When the structural member 79 and its companion members are pulled rearward inside the snake 21, the bow springs 28, 31 expand outward to engage the inside surface 16 of the pipe 17 as shown in FIG. 9. A means for locating joints and damaged pipe is again shown at 18.

FIG. 9 also illustrates the trowelling action of the flaps 55, 56. After a coating of sealant 38 is slung onto the inside surface 16 of the pipe 17 at the joint 32, the flaps 55, 56 trowel the sealant 38 circumferentially around and into the joint 32 to tightly pack the sealant 38 against the jute 35.

Figure 10:
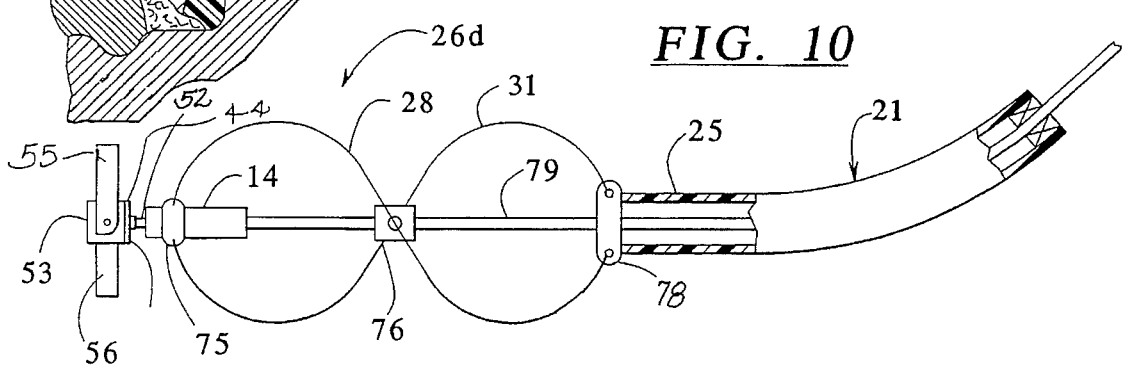
FIG. 10 is yet another side plan view of the cleaning and repairing apparatus of the present invention, particularly illustrating the centralizer.

Another view of applicator head 26d is shown in FIG. 10. The centralization means features at least two bow springs 28, 31 that are twisted into two half-coils. The center portion of each spring 28, 31 passes through the middle ferrule 76 which is slidably connected to the structural member 79. In other words, the middle ferrule 76 "floats" on the structural member 79. The front ferrule 75 is fixably connected to the means for rotating or motor means 14. The rear ferrule 78 is fixably connected to the distal end 25 of the snake 21. The structural member 79 is provided in the snake 21 to assist in the collapsing and expanding of the bow springs 28, 31 as discussed above with respect to FIG. 9. When the structural member 79 is pushed forward toward the means for rotating 14, the applicator head 26e is stretched away from the distal end 25 of the snake 21 thereby assisting the bow springs 28, 31 to collapse. When the structural member is pulled away from the means 14 for rotating, the applicator head 26e moves toward the distal end 25 of the snake 21 and the springs 28, 31 expand outward toward the inside surface of the pipe (not shown).

Turning now to FIG. 11, a partial sectional view of the applicator head 26d is illustrated. The means 18 for locating joints and damaged pipe may employ either a fiberscope, a video probe and/or a down hole camera. The image or video signal is transmitted through the snake 21 to the monitor 81.

A cross section of the snake 21 is provided in FIG. 12. The snake 21 features an outer plastic tube 82 and an additional protective wrap 83 for the conduits and cables. The conduit 45 is used to transport sealant; the motor supply conduit is shown at 84; the conduits for the means 18a for locating pipe joints and damaged pipe are shown at 85, 86; and, the structural member is shown at 79.

Referring now to FIG. 13, the insertion of the mid-section of the snake 21 through a tap fitting 22 is provided in greater detail. First, the entire applicator head 26 is inserted into the launch tube 23 or means for providing a sealed entry 23. Then, with the slide valve 92 in a closed position, the launch tube 23 is inserted into the tap fitting 22. The seal 94 assures a seal between the fitting 22 and the launch tube 23. The seal 95 ensures a seal between the launch tube 23 and the snake 21. When the operator is assured of no leakage at the seals 94, 95, the sliding valve 92 is opened and the applicator head 26 is plunged downward into the pipe 17.

Many varieties of the means for rotating 14 are available. If a gas main is being cleaned and repaired, it is preferable to use compressed methane gas to operate the means for rotating 14 because no contamination of the gas main will result. If air is used as the gas to power the means for rotating 14 and a gas main is being repaired, a return line must be provided in the snake because air cannot be allowed to enter into the gas main. If methane is used, the exhaust can be allowed to enter the main, eliminating the need for an exhaust line in the snake 21. Of course, a non-flammable gas or inert gas would be acceptable in many situations. Further, if no hazardous or flammable condition is deemed to exist by virtue of an oxygen-free environment (100% methane gas) in the main, an electric motor may be used for the means for rotating 14.

The means for locating the pipe joints and damaged pipe can also vary widely. Fiberscopes, video probes and down hole cameras will be preferred to provide a detailed, visual inspection of the interior of the pipe or gas main. Less expensive methods will include the use of eddy current sensors, electromagnetic sensors or joint locators. Of course, these devices may not provide detailed information regarding the condition of the pipe between the joints.

In the preferred embodiment, the sealant, under pressure, is provided by a positive displacement piston-type pump. The sealant delivery system also includes a sealant storage tank 12 (FIG. 1), a suitable pump, valves and controls as required.

The preferred sealant is an anaerobic-type sealant but other types of sealants will work. The sealant needs to be relatively thick (or having a high viscosity) so it will cling to the top of the pipe without slumping or falling off before the sealant cures. The preferred sealant will also be relatively flexible after curing to accommodate any future joint flexing without disbonding or deteriorating the seal.

Although only a limited number of embodiments of the present invention have been illustrated and described, it will at once be apparent to those skilled in the art that variations may be made within the spirit and scope of the invention. Accordingly, it is intended that the scope of the invention be limited solely by the scope of the hereafter appended claims and not by any specific wording in the foregoing description.

We claim:

1. An apparatus for applying sealant to leaks and joints along an inside surface of a pipe, the pipe having an axis extending along the length thereof,
   the apparatus comprising:
   a push snake for insertion into a pipe and removal from the pipe through a single point of entry, the push snake including a distal end, a proximate end and a mid-section,
   the distal end of the push snake including a head, the head including an applicator tip and a motor for rotating the applicator tip about the axis of the pipe,
   the proximate end of the push snake being connected to a pressurized supply of sealant, the pressurized supply of sealant being disposed outside of the pipe, the push snake providing communication between the pressurized supply of sealant and the applicator tip,
   the applicator tip includes at least one delivery tube in communication with the pressurized supply of sealant,
   the applicator tip also including a flat disk which is rotated by a motor, the motor does not impart rotation to the delivery tube,
   sealant is applied to the inside surface of the pipe when pressurized sealant is ejected from the delivery tube onto a front side of the disk during rotation of the disk, the applicator tip further including a pair of flaps pivotally attached to the applicator tip and biased into a position parallel to the axis of the pipe and the snake when the applicator tip is not spinning, the flaps being forced radially outward into a position perpendicular to the axis of the pipe when the applicator tip is spinning.

2. The apparatus of claim 1, wherein the mid-section of the push snake passes through provides a sealed entry of the push snake into the pipe.

3. The apparatus of claim 1, wherein the head also includes means for detecting the location of pipe joints.

4. The apparatus of claim 3, wherein the means for detecting the location of pipe joints is further characterized as including a fiberscope.

5. The apparatus of claim 3, wherein the means for detecting the location of pipe joints is further characterized as including a video probe.

6. The apparatus of claim 3, wherein the means for detecting the location of pipe joints is further characterized as including a down hole camera.

7. The apparatus of claim 3, wherein the means for detecting the location of pipe joints is further characterized as including an eddy current sensor.

8. The apparatus of claim 3, wherein the means for detecting the location of pipe joints is further characterized as including an electromagnetic sensor.

9. The apparatus of claim 1, wherein the head is further characterized as including means for centralizing the head of the push snake within the pipe.

10. The apparatus of claim 9, wherein the means for centralizing the head is further characterized as including
at least two spring-biased members for engaging the inside surface of the pipe,
means for retracting the spring biased members for easier insertion of the push snake into the pipe,
means for expanding the spring-biased members for causing the spring-biased members to bow outward against the inside surface of the pipe,
said means for retracting and said means for expanding being activated from the proximate end of the push snake.

11. The apparatus of claim 1, wherein the means for rotating the applicator tip is powered by compressed gas.

12. The apparatus of claim 11, wherein the compressed gas is gas withdrawn from the pipe, thereafter compressed and thereafter used to power the means for rotating the applicator tip.

13. The apparatus of claim 1, wherein the means for rotating the applicator tip is an electric motor.

14. The apparatus of claim 1, wherein each of said flaps include a stiffening backing member to increase the rigidity of the flap when the flap is used to clean the inside surface of the pipe prior to the application of sealant thereto.

15. The apparatus of claim 1, wherein the two flaps may be locked into the biased position when the applicator tip is spinning.

16. An apparatus for applying sealant to leaks and joints along an inside surface of a pipe, the pipe having an axis extending along the length thereof, the apparatus comprising:
a push snake for insertion into a pipe and removal from the pipe through a single point of entry, the push snake including a distal end, a proximate end and a mid-section,
the distal end of the push snake including an applicator tip for applying sealant in a radially outward direction toward the inside surface of the pipe, the applicator tip including at least one sealant delivery tube and a rotatable disk which is rotated by a motor, sealant is applied to the inside surface of the pipe when pressurized sealant is ejected from the delivery tube onto a front side of the disk during rotation of the disk, the motor does not impart rotation to the delivery tube,
the applicator tip further comprises at least one elongated flap that is pivotally attached to the applicator tip, the flap being spring biased into a position that is parallel with the axis of the pipe and the push snake when the applicator tip is rotated, the flap pivoting radially outward to make contact with the inside surface of the pipe when the rotatable disk spins, the flap assuming a retracted position along the axis of the pipe and the snake when the rotatable disk is not spinning,
the proximate end of the push snake being connected to a reservoir of sealant, the reservoir of sealant being disposed outside of the pipe,
the mid-section of the push snake passing through means for providing a sealed entry of the push snake into the pipe,
the push snake providing fluid communication between the delivery tube and the reservoir of pressurized sealant.

17. The apparatus of claim 16, wherein the distal end of the push snake includes means for detecting the location of pipe joints and means for centralizing the applicator tip inside the pipe.

18. The apparatus of claim 16, wherein the flap also including a stiffening backing member to increase the rigidity of the flap when the flap is used to clean the inside surface of the pipe prior to the application of sealant thereto.

19. The apparatus of claim 18, wherein the applicator tip includes at least two flaps, each of the flaps including at least one stiffening backing member.

20. The apparatus of claim 19, wherein the two flaps are pivotally attached to the applicator tip, the flaps being spring biased into a position that is parallel with the axis of the pipe and the push snake, the flaps pivoting outward from the spring biased position and assuming a position directed radially outward toward the inside wall of the pipe when the applicator tip is spinning.

21. The apparatus of claim 20, wherein the two flaps may be locked into the biased position when the applicator tip is spinning.

* * * * *